Patented Dec. 8, 1953

2,662,031

UNITED STATES PATENT OFFICE 2,662,031

ARTISTS' WATER-COLOR PAINTS

Max R. Vogel and George D. La Barre, Easton, and William M. Perry, Bethlehem, Pa., assignors to Binney and Smith Company, Easton, Pa., a corporation of New Jersey No Drawing. Application June 14, 1951, Serial No. 231,674

3 Claims. (Cl. 106—287)

This invention relates to artists' water color paints that are in semi-solid or cake form ordinarily contained in small pans and sold in paint boxes usually for the use of children and art students.

Artists' water color paints are ordinarily prepared by mixing or dispersing a coloring agent in a suitable water-soluble vehicle to obtain a composition which can be poured by hand or by machine into small containers. The containers are then placed in a kiln and the water content of the composition is reduced by forced drying until incompletely dried cakes remain in the containers.

A vehicle for water color paint sets is desirable which is water-soluble, resistant to decomposition, stable under varying weather conditions, and which possesses good binding properties. The vehicle should be compatible with a wide range of inorganic pigments, lakes, and toners; and it should have good flow characteristics, good brushing properties and it should be non-toxic to humans and non-attractive to insects.

Cost is an important consideration in the manufacture of such artists' paints. One factor that contributes to the cost of production is the time and labor required for evaporating excess moisture from the composition after pouring, even under forced drying conditions. Accordingly, the vehicle should be one which by its inherent chemical and physical properties does not require the addition of a large amount of water.

One composition that fulfills such requirements is a water-soluble wax sold under the name of "Carbowax" comprising solid polyethylene glycol, and more especially that form of "Carbowax" which has an average molecular weight between 4000 and 6000. This wax, which is similar to paraffin wax in appearance and texture, is especially suitable for the manufacture of water color paints because it is soluble in water and meets all the conditions for an ideal vehicle as outlined above. "Carbowax" is uniquely suited for the production of water color paints because it can be reduced to the liquid state by melting and the necessary coloring materials, conditioners, plasticizers, surface modifying agents added; after that the mixture can be readily poured into small containers and allowed to harden at room temperature. Such a composition eliminates the necessity for adding and subsequently removing excess water.

The use of "Carbowax" for the manufacture of water paints and water soluble crayons has already been suggested and hence no novelty for the use of this compound broadly as a component of water paints is claimed in this application. Its use as liquefiable water paint vehicle is desirable because it simplifies, facilitates and renders more economical the manufacturing procedure.

However, a simple molten mixture of "Carbowax" and coloring material produces a water color that has an objectionable appearance because, during the solidification of the paints in the containers, the wax is subjected to internal stresses. Crystallization occurs which imparts a shrunken and lusterless appearance to the solidified paint; that is, during cooling of the molten wax it tends to contract toward the sides of the pans, leaving a depression, crack or void in the center of the solidified cake and the surface becomes pitted with small holes; or the internal stresses may, at times, form unsightly lumps on the surface. While the quality of the composition as a painting medium does not appear to be impaired, its appearance nevertheless seriously detracts from its sales appeal.

While we cannot say with certainty what causes the physical condition just described, there seems reason to suppose that the vehicle "Carbowax" is composed of many fractions of polyethylene glycol molecules of different molecular weights. Presumably, these fractions have different melting points so that, during the tranusition of the wax from a liquid to a solid state, the various fractions undergo crystallization progressively, probably according to their respective molecular weights, resulting in the development of internal stresses which produce disruption and the unsightly appearance mentioned in the solidified paint. Also, the coefficients of expansion of the fractions in both the liquid and solid states may contribute to the aforementioned undesirable surface effects.

Whatever may be the explanation of this phenomenon, it is an object of the present invention to provide a water color paint containing as its major ingredient solid polyethylene glycol, such as "Carbowax," together with suitable modifying agents which prevent or, in any event, greatly retard the formation of rough unsightly surfaces during solidification of the paint.

The present invention in its broad concept contemplates a water-soluble, liquefiable vehicle for a water color paint comprising as a major ingredient, solid polyethylene glycol of high molecular weight (e. g., having an average molecular weight between 4,000 and 6,000) together with a minor amount of modifying agents serving to counteract the normal non-uniform crystallization properties of the polyethylene glycol.

More particularly, the invention contemplates the use as modifying agent a composition comprising an alcohol such as stearyl alcohol (1-octadecanol) and an aqueous solution of a polyhydroxy compound such as sorbitol.

Other objects and advantages of the invention will appear hereinafter.

A water color paint was prepared in accordance with the invention having the following composition:

| | Grams |
|---|---|
| Solid polyethylene glycol (Carbowax 6000) | 30.00 |
| Stearyl alcohol | 1.25 |
| Sorbitol solution | 2–4.00 |
| Dispersing agent ("Lomar PW") | 0.50 |
| Extender | 0–25.00 |
| Coloring agent | 0–15.00 |

The solid polyethylene glycol used was a wax-like derivation of polyhydric alcohol marketed under the name of "Carbowax 6000" by Carbide and Chemicals Corporation. These solid polyethylene glycols are sold by number designation, such as "Carbowax 1500," "Carbowax 4000" and "Carbowax 6000," the number indicating the average molecular weight of the composition.

The stearyl alcohol was that sold under the name "Stenol" or "Lorol 28" by E. I. Du Pont De Nemours and Company.

The sorbitol solution was composed of fifty parts sorbitol and fifty parts water and was prepared by dissolving the sorbitol in the water.

The dispersing agent for the pigment was "Lomar PW." It is the sodium salt of a condensed mono-naphthalene sulfonic acid sold by Jacques Wolf and Company with the following probable structural formula:

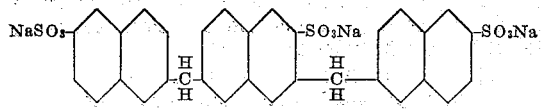

and the following empirical formula:

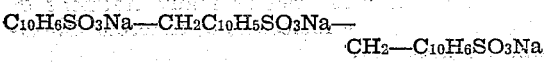

The specific dispersing agent selected is not of critical importance to the modifying action of the stearyl alcohol and the sorbitol solution. The dispersing agent will be chosen according to its ability to produce an efficient dispersion of the pigment within the polyethylene glycol vehicle. We have found that dispersing agents of the general type comprising a salt of a naphthalene sulfonic acid are suitable for use. For example a suitable substitute for the "Lomar PW" in the above composition is a product sold under the name of "Daxad 11" (an alkyl naphthalene sulfonic acid) by Dewey and Almy Company. Also suitable as a substitute for the "Lomar PW" is a product sold under the name of "Tamol P" (a sodium salt of condensed arylsulfonic acid) by Rohm and Haas.

The specific extender employed was blanc fixe (precipitated barium sulfate), although other extenders that are compatible with the "Carbowax," such as finely ground calcium carbonate or kaolin, may be used.

The coloring agent selected will depend upon the color to be imparted to the paint and, so far as we are aware, is not a matter of critical importance and may include any of the usual organic or inorganic coloring agents, such as ultramarine blue, carbon black, brilliant green (tetraethyldiamino-triphenylcarbhydride sulfate) precipitated on a phosphotungstic or phosphomolybdic and phosphotungstomolybdic base, carmine, etc. The term "coloring agent" is used herein in a broad sense to include free dyestuffs, such as methyl violet, rhodamine 6G (ethyl ester of diethylrhodamine), alizarin, etc.

In the preparation of the water color paint, the solid polyethylene glycol, as "Carbowax 6000" is heated to approximately 160° F. at which temperature it is freely flowable. The sorbitol solution is then stirred into the liquid "Carbowax." We term this, for convenience, batch A.

Batch B is prepared by grinding together the stearyl alcohol, the dispersing agent and the coloring agent, along with the extender, to obtain a thorough dispersion of color throughout the mass.

Batch B is then added to batch A and the resulting mass stirred together to obtain a uniform paint composition. This composition is then poured into shallow pans wherein it is allowed to cool and solidify.

If desired, ethylene glycol and water may be substituted for the sorbitol solution in the foregoing example. A paint of the following composition was prepared which possessed a uniformly smooth appearance free from noticeable voids, cracks or localized ruptures throughout its surface area:

| | Grams |
|---|---|
| Solid polyethylene glycol (Carbowax 6000) | 30.00 |
| Stearyl alcohol | 1.00 |
| Ethylene glycol | 1.00 |
| Water | 1.00 |
| Dispersing agent ("Tamol P") | 0.50 |
| Coloring agent | 11.30 |

The solid polyethylene glycol ("Carbowax 6000") was heated to 160° F., at which temperature it was a free-flowing liquid, and the stearyl alcohol, ethylene glycol and water were stirred into the "Carbowax." For convenience, we will call this mixture batch A.

Batch B was prepared by intimately mixing together the dispersing agent "Tamol P," and orange lake (10 gms.) and naphthol yellow (1.30 gms.) as the coloring agents.

Batch B was added with stirring to batch A. Stirring was continued to evenly disperse the coloring agents and the mixture was then poured into small containers and allowed to cool.

The color paints presented a pleasing appearance and possessed good painting qualities.

We claim:

1. A water color paint consisting essentially of about 30 parts by weight as a water soluble vehicle of a wax-like solid polyethylene glycol having a molecular weight from about 4000 to about 6000, from about 1 to 1.25 parts by weight of stearyl alcohol, from about 1 to 2 parts by weight of a modifying agent of the group consisting of polyhydric alcohols having from 2 to 6 carbon atoms, from about 1 to 2 parts by weight of water, and a coloring agent.

2. A water color paint as defined in claim 1 wherein the modifying agent is sorbitol.

3. A water color paint as defined in claim 1 wherein the modifying agent is ethylene glycol.

MAX R. VOGEL.
GEORGE D. LA BARRE.
WILLIAM M. PERRY.

References Cited in the file of this patent

UNITED STATES PATENTS

| Number | Name | Date |
|---|---|---|
| 2,344,671 | Bertsch | Mar. 21, 1944 |

OTHER REFERENCES

"Carbowax Compounds and Polyethylene Glycol"; Carbide and Carbon Chemical Corp., New York. Copyright 1946, page 3.

"Glycols"; Carbide and Carbon Chemical Corp., New York. Copyright 1947, page 3.

"Atlas Sorbitol"; Atlas Powder Co. Copyright 1947, page 11.